US012684653B2

(12) United States Patent
Qi et al.

(10) Patent No.: US 12,684,653 B2
(45) Date of Patent: *Jul. 14, 2026

(54) INTERACTION CONTROL METHOD AND APPARATUS, TERMINAL, AND STORAGE MEDIUM

(71) Applicant: Honor Device Co., Ltd., Shenzhen (CN)

(72) Inventors: Yunfei Qi, Shenzhen (CN); Yuzhuo Peng, Shenzhen (CN); Ping Song, Shenzhen (CN); Yan Gao, Shenzhen (CN); Fei Ye, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 267 days.

This patent is subject to a terminal disclaimer.

(21) Appl. No.: 18/531,139

(22) Filed: Dec. 6, 2023

(65) Prior Publication Data

US 2024/0114594 A1     Apr. 4, 2024

Related U.S. Application Data

(63) Continuation of application No. 17/759,024, filed as application No. PCT/CN2021/094122 on May 17, 2021, now Pat. No. 11,871,482.

(30) Foreign Application Priority Data

Jun. 30, 2020    (CN) .......................... 202010621663.0

(51) Int. Cl.
| | |
|---|---|
| *H04W 84/20* | (2009.01) |
| *H04W 4/80* | (2018.01) |
| *H04W 76/10* | (2018.01) |

(52) U.S. Cl.
CPC ............. *H04W 84/20* (2013.01); *H04W 4/80* (2018.02); *H04W 76/10* (2018.02)

(58) Field of Classification Search
CPC ........ H04W 4/80; H04W 76/10; H04W 84/20
See application file for complete search history.

(56) References Cited

U.S. PATENT DOCUMENTS

| | | |
|---|---|---|
| 10,660,019 B2 | 5/2020 | Meredith et al. |
| 2015/0317621 A1 | 11/2015 | Jin |
| 2016/0057563 A1 | 2/2016 | Yang |
| 2018/0270736 A1 | 9/2018 | Meredith et al. |
| 2019/0026212 A1 | 1/2019 | Verkasalo |

(Continued)

FOREIGN PATENT DOCUMENTS

| | | |
|---|---|---|
| CN | 101790183 A | 7/2010 |
| CN | 105472534 A | 4/2016 |
| CN | 103687060 B | 5/2019 |

(Continued)

*Primary Examiner* — Tuan H Nguyen
(74) *Attorney, Agent, or Firm* — Slater Matsil, LLP

(57) ABSTRACT

An interaction control method includes: acquiring NFC device status information in response to triggering of near field communication NFC, where the NFC device status information includes status information of a master device and status information of a slave device; and providing an interactive function corresponding to the acquired NFC device status information according to a preset mapping relationship, and executing the interactive function in response to a trigger condition to realize information exchange between the master device and the slave device.

20 Claims, 12 Drawing Sheets

Acquiring NFC device status information in response to triggering of near field communication NFC    —101

Providing an interactive function corresponding to the acquired NFC device status information according to a preset mapping relationship, and executing the interactive function in response to a trigger condition    —102

(56) References Cited

U.S. PATENT DOCUMENTS

| 2019/0114021 A1 | 4/2019 | Oliver et al. |
| 2021/0189625 A1 | 6/2021 | Xu et al. |

FOREIGN PATENT DOCUMENTS

| CN | 110704123 | A | 1/2020 |
| CN | 111093284 | A | 5/2020 |
| WO | 2013067788 | A1 | 5/2013 |
| WO | 2018072085 | A1 | 4/2018 |

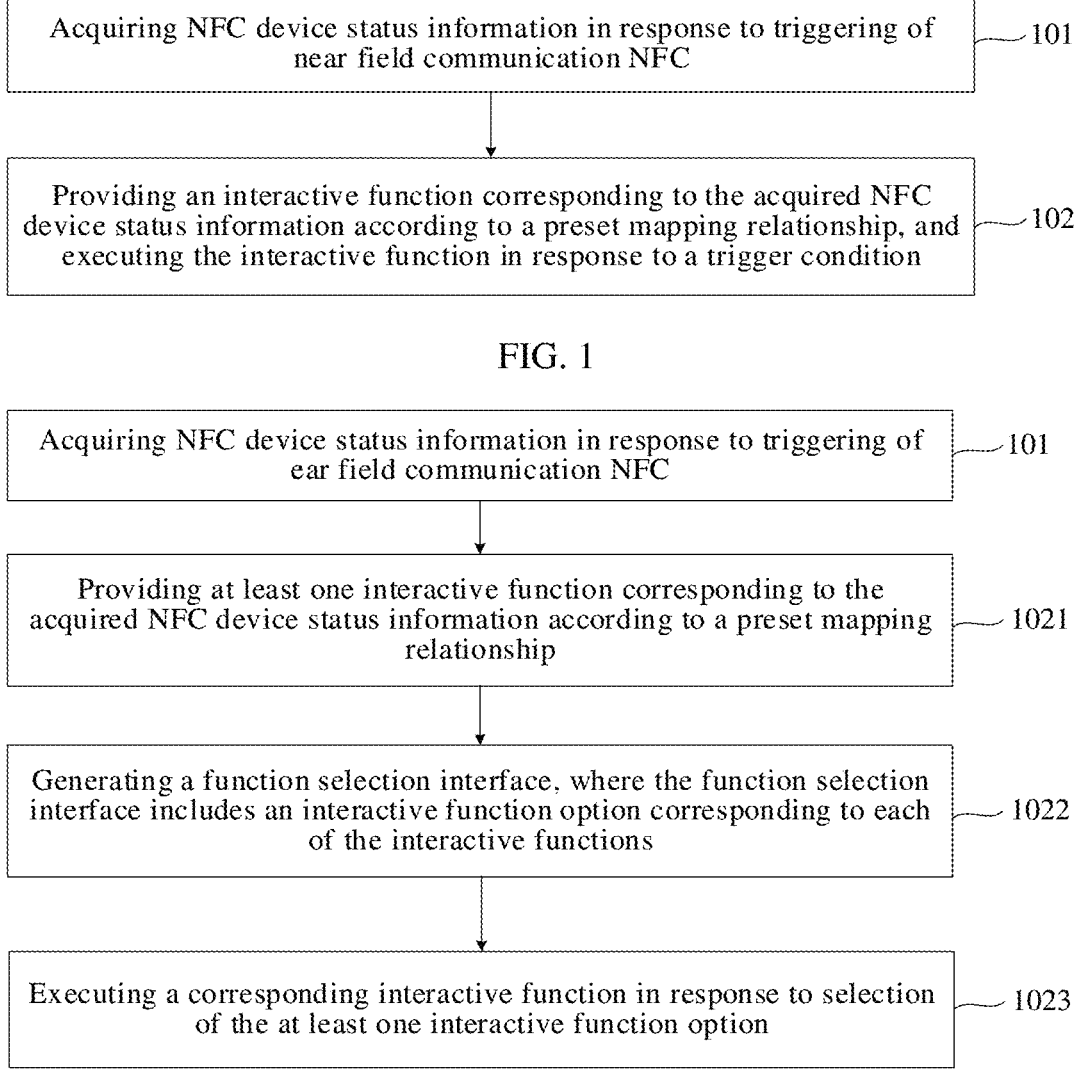

Acquiring NFC device status information in response to triggering of near field communication NFC ——101

Providing an interactive function corresponding to the acquired NFC device status information according to a preset mapping relationship, and executing the interactive function in response to a trigger condition ——102

FIG. 1

Acquiring NFC device status information in response to triggering of ear field communication NFC ——101

Providing at least one interactive function corresponding to the acquired NFC device status information according to a preset mapping relationship ——1021

Generating a function selection interface, where the function selection interface includes an interactive function option corresponding to each of the interactive functions ——1022

Executing a corresponding interactive function in response to selection of the at least one interactive function option ——1023

FIG. 2

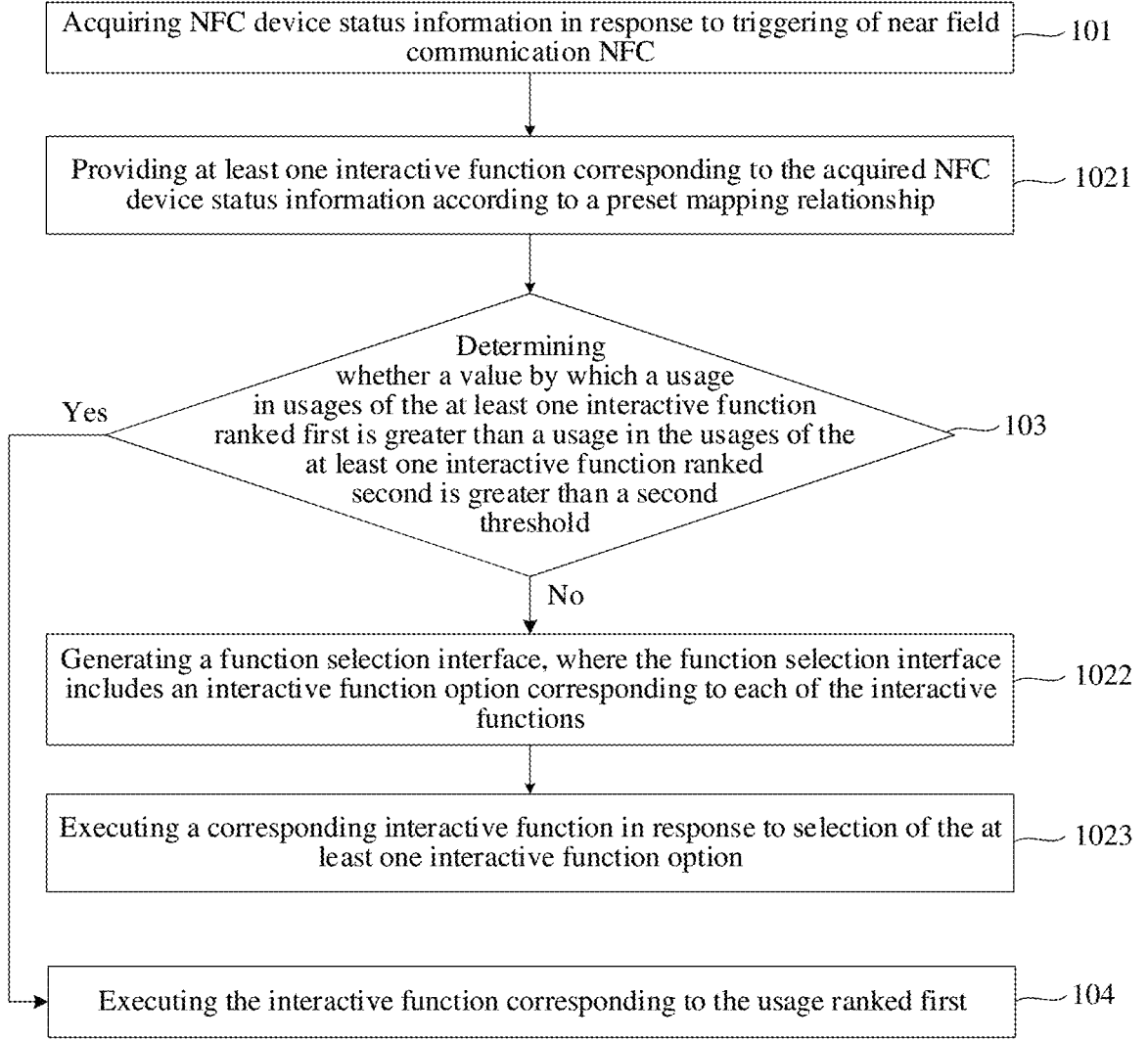

Acquiring NFC device status information in response to triggering of near field communication NFC — 101

Providing at least one interactive function corresponding to the acquired NFC device status information according to a preset mapping relationship — 1021

Determining whether a value by which a usage in usages of the at least one interactive function ranked first is greater than a usage in the usages of the at least one interactive function ranked second is greater than a second threshold — 103

Yes

No

Generating a function selection interface, where the function selection interface includes an interactive function option corresponding to each of the interactive functions — 1022

Executing a corresponding interactive function in response to selection of the at least one interactive function option — 1023

Executing the interactive function corresponding to the usage ranked first — 104

INTERACTION CONTROL METHOD AND APPARATUS, TERMINAL, AND STORAGE MEDIUM

CROSS-REFERENCE TO RELATED APPLICATIONS

This application is a continuation of U.S. patent application Ser. No. 17/759,024, filed on Jul. 18, 2022, which is a national stage of International Application No. PCT/CN2021/094122, filed on May 17, 2021, which claims priority to Chinese Patent Application No. 202010621663.0, filed on Jun. 30, 2020. All of the aforementioned applications are hereby incorporated by reference in their entireties.

TECHNICAL FIELD

This application relates to the field of communications technologies, and in particular, to an interaction control method and apparatus, a terminal, and a storage medium.

BACKGROUND

As users possess increasing smart devices, scenarios of interaction among the devices continuously increase, such as interaction between a mobile phone and a tablet computer, interaction between a mobile phone and a smart watch, or interaction between a mobile phone and a Bluetooth headset. Currently, interaction among devices requires a corresponding setting or guidance to establish connection between different devices. However, the interaction among devices is relatively cumbersome.

SUMMARY

Technical solutions of this application provide an interaction control method and apparatus, a terminal, and a storage medium. A corresponding interactive function can be provided based on NFC, to realize relatively efficient interaction between devices by NFC.

According to a first aspect, an embodiment of this application provides an interaction control method. The method includes:

acquiring NFC device status information in response to triggering of near field communication NFC, where the NFC device status information includes status information of a master device and status information of a slave device; and providing an interactive function corresponding to the acquired NFC device status information according to a preset mapping relationship, and executing the interactive function in response to a trigger condition to realize information exchange between the master device and the slave device.

Optionally, the status information of the master device includes a foreground application of the master device and a status of the foreground application of the master device; and the status information of the slave device includes a foreground application of the slave device and a status of the foreground application of the slave device.

Optionally, the status information of the master device further includes a type of the master device, and the status information of the slave device further includes a type of the slave device.

Optionally, a process of the providing an interactive function corresponding to the acquired NFC device status information according to a preset mapping relationship, and executing the interactive function in response to a trigger condition to realize information exchange between the master device and the slave device includes:

providing at least one interactive function corresponding to the acquired NFC device status information according to the preset mapping relationship, and executing one of the at least one interactive function in response to the trigger condition, to realize the information exchange between the master device and the slave device.

Optionally, a process of the providing at least one interactive function corresponding to the acquired NFC device status information according to the preset mapping relationship, and executing one of the at least one interactive function in response to the trigger condition, to realize the information exchange between the master device and the slave device includes:

providing the at least one interactive function corresponding to the acquired NFC device status information according to the preset mapping relationship;

generating a function selection interface, where the function selection interface includes an interactive function option corresponding to each of the interactive functions; and executing a corresponding interactive function in response to selection of the at least one interactive function option, to realize the information exchange between the master device and the slave device.

Optionally, in a case that a value by which a usage in usages of the at least one interactive function ranked first is greater than a usage in the usages of the at least one interactive function ranked second is within a first threshold range, the interactive function option corresponding to the usage ranked first is prominently displayed in the function selection interface relative to the interactive function options of other interactive functions.

Optionally, before the generating a function selection interface, the method further includes:

determining whether a value by which a usage in usages of the at least one interactive function ranked first is greater than a usage in the usages of the at least one interactive function ranked second is greater than a second threshold, and executing the interactive function corresponding to the usage ranked first in a case that the value is greater than the second threshold, or executing the process of generating the function selection interface in a case that the value is not greater than the second threshold.

Optionally, the at least one interactive function includes a permanent interactive function and a replaceable interactive function, and the preset mapping relationship is used for reflecting a correspondence between the replaceable interactive function and the NFC device status information.

According to a second aspect, an embodiment of this application provides an interaction control apparatus. The apparatus includes a processor and a memory, where the memory is configured to store at least one instruction, and the instruction, when loaded and executed by the processor, implements the above method.

According to a third aspect, an embodiment of this application provides a terminal. The terminal includes the above apparatus.

According to a fourth aspect, an embodiment of this application provides a computer-readable storage medium. A computer program is stored in the computer-readable storage medium, and the computer program, when executed on a computer, causes the computer to perform the above method.

According to the interaction control method and apparatus, the terminal, and the storage medium in the embodiments of this application, the NFC device status information is acquired based on the triggering of the NFC, and the interactive function corresponding to the acquired NFC device status information is provided according to the preset mapping relationship, so as to realize the information exchange between NFC devices. In this way, setting and guidance before different interactive functions are simplified, and efficiency of interaction between devices is improved.

BRIEF DESCRIPTION OF THE DRAWINGS

FIG. 1 is a flowchart of an interaction control method according to an embodiment of this application;

FIG. 2 is a flowchart of another interaction control method according to an embodiment of this application;

FIG. 4 is a flowchart of another interaction control method according to an embodiment of this application.

DETAILED DESCRIPTION OF ILLUSTRATIVE EMBODIMENTS

Figure 3A:
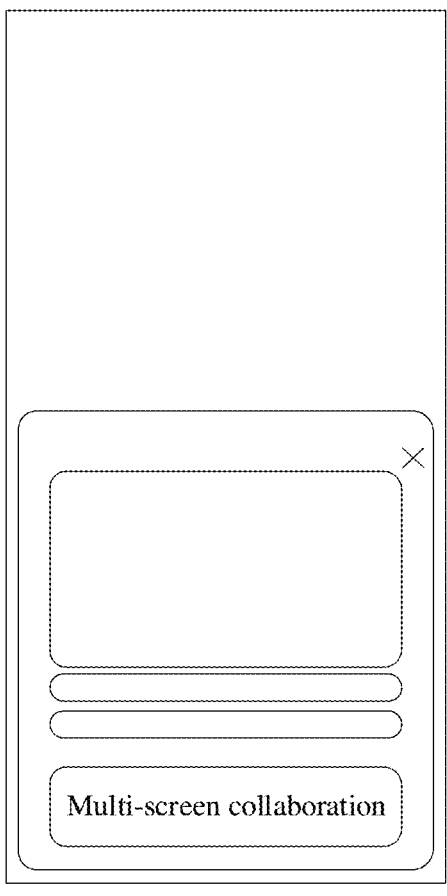
FIG. 3a is a schematic diagram of a function selection interface according to an embodiment of the present application.

Terms used in implementations of this application are merely used to explain specific embodiments of this application, but are not intended to limit this application.

As shown in FIG. 1, FIG. 1 is a flowchart of an interaction control method according to an embodiment of this application. An embodiment of this application provides an interaction control method. The interaction control method is based on a near field communication (Near Field Communication, NFC) technology. An execution subject of the interaction control method is a master device in an NFC device. The method includes the following steps:

Step 101: Acquiring NFC device status information in response to triggering of near field communication NFC, where the NFC device status information includes status information of a master device and status information of a slave device.

When a master device and a slave device touch each other, NFC is triggered and NFC-based communication is realized between the master device and the slave device. At this time, the master device acquires the status information of the master device and the status information of the slave device.

Step 102: Providing an interactive function corresponding to the acquired NFC device status information according to a preset mapping relationship, and executing the interactive function in response to a trigger condition to realize information exchange between the master device and the slave device.

Specifically, a preset mapping relationship is stored in the master device. The mapping relationship is used for reflecting a mapping relationship between the NFC device status information and an interactive function. The status information of the master device is used for reflecting a current status of the master device, and the status information of the slave device is used for reflecting a current status of the slave device. For example, Table 1 illustrates an example of the mapping relationship.

TABLE 1

| Status information of master device | | | Status information of slave device | | | |
|---|---|---|---|---|---|---|
| Foreground application | Device type | Application status | Foreground application | Device type | Application status | Interactive function |
| Application A | Mobile phone | Playing a video | Application A | Tablet computer | Not playing a video | Continuing playback of a video on a tablet computer from a mobile phone |
| Application A | Mobile phone | Not playing a video | Application A | Tablet computer | Playing a video | Continuing playback of a video on a mobile phone from a tablet computer |
| System B | Mobile phone | Any state | System B | Tablet computer | Any state | Multi-screen collaboration |

TABLE 1-continued

| Status information of master device | | | Status information of slave device | | | |
|---|---|---|---|---|---|---|
| Foreground application | Device type | Application status | Foreground application | Device type | Application status | Interactive function |
| Application C | Mobile phone | Opening a file | Application C | Tablet computer | Not opening a file | Transferring a file to a tablet computer from a mobile phone |
| Application C | Mobile phone | Any state | Application C | Tablet computer | Opening a file | Transferring a file to a mobile phone from a tablet computer |

In a scenario of interaction between devices, users require different interactive functions. Device status information can reflect interaction requirements of a user to a certain extent. For example, an application running in a foreground of a mobile phone of the user is a video application and the video application is playing a video, and an application running in a foreground of a tablet computer is the same video application and the video application is not playing a video. At this time, the user causes the mobile phone and the tablet computer to touch each other, so that NFC is triggered and device status information of the mobile phone and the tablet computer is acquired, and a function of continuing playback of a video on a tablet computer from a mobile phone is provided according to the pre-stored mapping relationship. Therefore, the function of continuing playback of a video on a tablet computer from a mobile phone can be subsequently executed in response to a trigger condition. Different interactive functions are provided according to different NFC device status information, to adapt to different requirements of scenarios of interaction between devices. The trigger condition in step 102 may be active triggering based on the user, or may be passive triggering when a preset trigger condition is satisfied.

According to the interaction control method in this embodiment of this application, the NFC device status information is acquired based on the triggering of the NFC, and the interactive function corresponding to the acquired NFC device status information is provided according to the preset mapping relationship, so as to realize the information exchange between NFC devices. In this way, setting and guidance before different interactive functions are simplified, and efficiency of interaction between devices is improved.

Optionally, the status information of the master device includes a foreground application of the master device and a status of the foreground application of the master device; and the status information of the slave device includes a foreground application of the slave device and a status of the foreground application of the slave device.

Specifically, the application herein may be a third-party application or a system-level application. For example, the application A is a video playback application, and the application C is a text processing application. When the application A is running in the foreground of the device, it is determined that the foreground application is the application A. When the device displays a desktop interface of a system, it is determined that the foreground application is the system B. When the application C is running in the foreground of the device, it is determined that the foreground application is the application C. That is to say, in this embodiment of this application, a specific application running in the foreground application and a status of the application may be determined according to the device status information, and a to-be-executed interactive function is further determined according to the specific application and the status. For example, when it is determined that the foreground applications of the master device and the slave device are both the application A configured to play videos and that the master device is playing a video and the slave device is not playing a video, a function of continuing playback of a video on the slave device from the master device is provided. That is to say, the slave device continues playback of the video currently played on the master device. In other feasible implementations, the type of the foreground application may be determined according to the device status information. For example, when it is determined that the foreground applications of the master device and the slave device are both the application configured to play a video and that the master device is playing a video and the slave device is not playing a video, the function of continuing playback of a video on the slave device from the master device is provided. That is to say, the slave device is caused to continue playback of the video currently played on the master device. That is to say, in this embodiment of this application, the to-be-executed interactive function may be determined according to the foreground application and the status of the foreground application and the corresponding interactive function may be provided.

Optionally, the status information of the master device further includes a type of the master device, and the status information of the slave device further includes a type of the slave device.

Specifically, the device type is used for determining the type of the device. That is to say, in this embodiment of this application, the to-be-executed interactive function may be further determined according to the type of the device, and the corresponding interactive function is provided. For example, if it is determined that the device type of the slave device is the tablet computer, a corresponding interactive function in Table 1 may be provided. If it is determined that the device type of the slave device is a Bluetooth headset, an interactive function of Bluetooth audio connection is provided.

Optionally, a process of providing the interactive function corresponding to the acquired NFC device status information according to the preset mapping relationship, and executing the interactive function in response to the trigger condition to realize the information exchange between the master device and the slave device in step 102 includes: providing at least one interactive function corresponding to the acquired NFC device status information according to the preset mapping relationship, and executing one of the at least one interactive function in response to the trigger condition, to realize the information exchange between the master device and the slave device.

Specifically, in this embodiment of this application, a quantity of the interactive functions provided according to NFC device status information is not limited. In Table 1, only one corresponding interactive function is provided according to one type of NFC device status information. However, in other feasible implementations, a plurality of corresponding interactive functions may be provided according to a same type of NFC device status information.

Optionally, as shown in FIG. 2, FIG. 2 is a flowchart of another interaction control method according to an embodiment of this application. A process of providing the at least one interactive function corresponding to the acquired NFC device status information according to the preset mapping relationship, and executing one of the at least one interactive function in response to the trigger condition, to realize the information exchange between the master device and the slave device in step 102 includes the following steps:

Step 1021: Providing the at least one interactive function corresponding to the acquired NFC device status information according to the preset mapping relationship.

Step 1022: Generating a function selection interface, where the function selection interface includes an interactive function option corresponding to each of the interactive functions.

Step 1023: Executing a corresponding interactive function in response to selection of the at least one interactive function option, to realize the information exchange between the master device and the slave device.

Figure 3B:
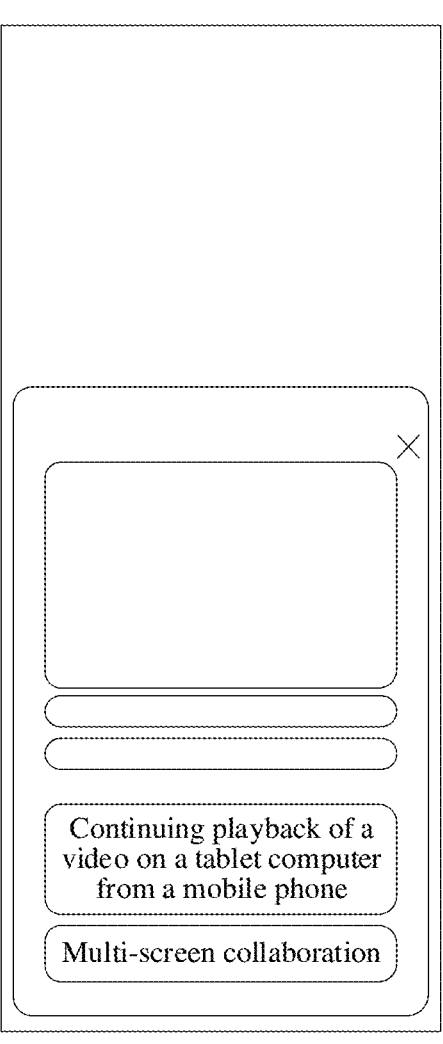
FIG. 3b is a schematic diagram of another function selection interface according to an embodiment of this application.
Figure 3C:
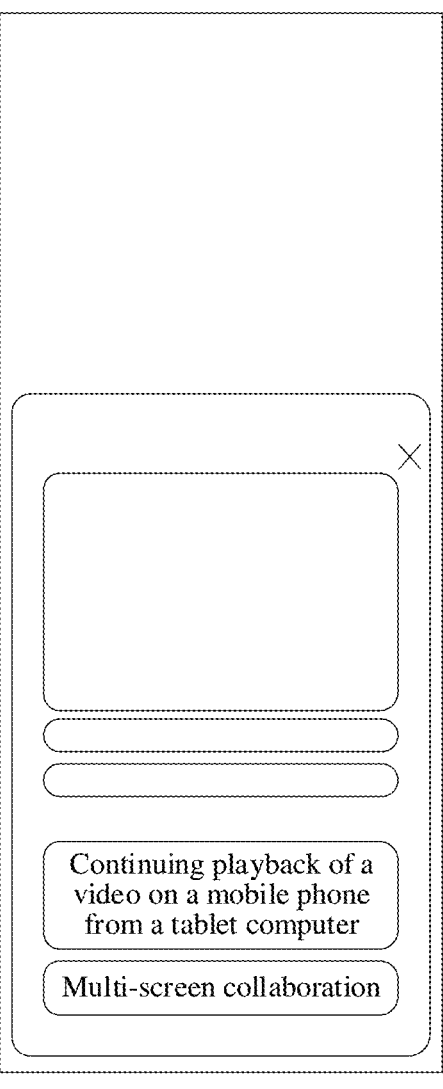
FIG. 3c is a schematic diagram of another function selection interface according to an embodiment of this application.
Figure 3D:
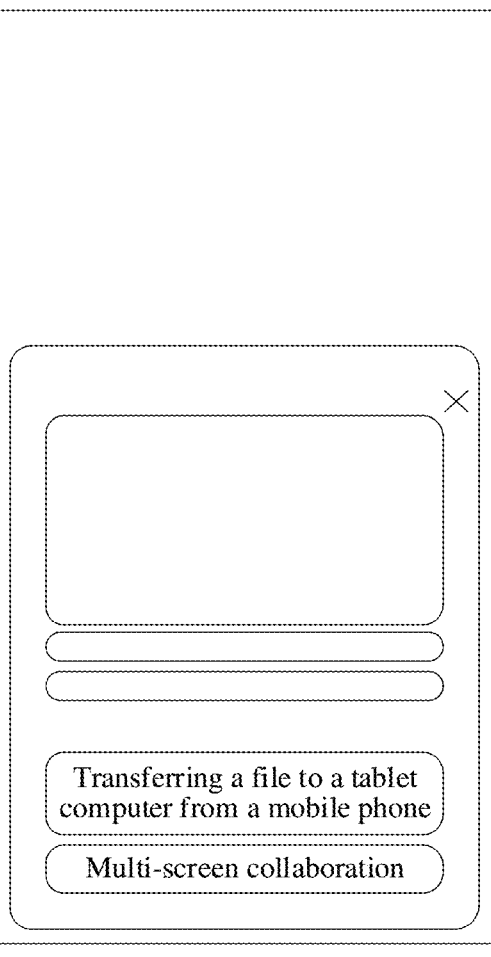
FIG. 3d is a schematic diagram of a function selection interface according to an embodiment of the present application.
Figure 3E:
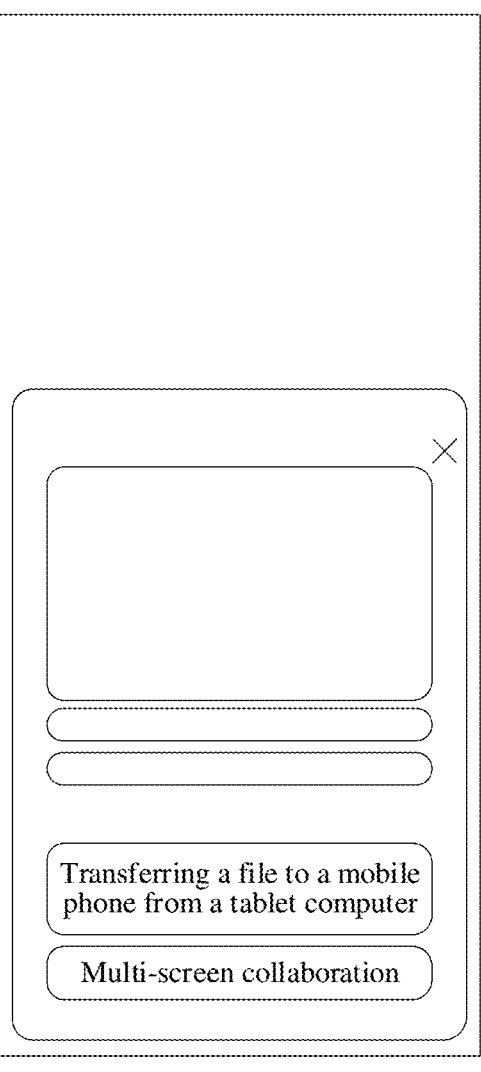
FIG. 3e is a schematic diagram of another function selection interface according to an embodiment of this application.

Specifically, as shown in FIG. 3a to FIG. 3e, FIG. 3a to FIG. 3e are five function selection interfaces according to an embodiment of this application. The above interaction control method is described below by using five cases: For example, in a first case, the master device is a mobile phone that is running a desktop of the system B in the foreground, and the slave device is a tablet computer that is running the system B in the foreground. When the master device touches the slave device to trigger NFC, the interactive function of multi-screen collaboration is provided, and the function selection interface shown in FIG. 3a is generated. If the user selects an option of multi-screen collaboration in the interface, the multi-screen collaboration function is executed. In a second case, the master device is a mobile phone that is playing a video by using the application A in the foreground, and the slave device is a tablet computer that is running the application A in the foreground but is not playing a video. When the master device touches the slave device to trigger NFC, an interactive function of continuing playback of a video on the tablet computer from the mobile phone is provided, the interactive function of multi-screen collaboration is provided, and the function selection interface shown in FIG. 3b is generated. If the user selects the option of multi-screen collaboration in the interface, the multi-screen collaboration function is executed. If the user selects the option of continuing playback of a video on the tablet computer from the mobile phone in the interface, the tablet computer is caused to continue playback of the video currently played on the mobile phone. In a third case, the master device is a mobile phone that is running the application A in the foreground but is not playing a video, and the slave device is a tablet computer that is running the application A in the foreground and is playing a video. When the master device touches the slave device to trigger NFC, an interactive function of continuing playback of a video on the mobile phone from the tablet computer is provided, the interactive function of multi-screen collaboration is provided, and the function selection interface shown in FIG. 3c is generated. If the user selects the option of multi-screen collaboration in the interface, the multi-screen collaboration function is executed. If the user selects the option of continuing playback of a video on the mobile phone from the tablet computer in the interface, the mobile phone is caused to continue playback of the video currently played on the tablet computer; In a fourth case, the master device is a mobile phone that is running the application C in the foreground and the application C is a text processing application that is opening a file, and the slave device is a tablet computer that is running the application C in the foreground but is not opening a file. When the master device touches the slave device to trigger NFC, the interactive function of transferring, by the mobile phone, a file to the tablet commuter is provided, the interactive function of multi-screen collaboration is provided, and the function selection interface shown in FIG. 3d is generated. If the user selects the option of multi-screen collaboration in the interface, the multi-screen collaboration function is executed. If the user selects the option of transferring, by the mobile phone, a file to the tablet commuter in the interface, the file currently opened on the mobile phone is transferred to the tablet computer. In a fifth case, the master device is a mobile phone that is running the application C in the foreground and the application C is a text processing application that is not opening a file, and the slave device is a tablet computer that is running the application C in the foreground and is opening a file. When the master device touches the slave device to trigger NFC, the interactive function of transferring, by the tablet commuter, a file to the mobile phone is provided, the interactive function of multi-screen collaboration is provided, and the function selection interface shown in FIG. 3e is generated. If the user selects the option of multi-screen collaboration in the interface, the multi-screen collaboration function is executed. If the user selects the option of transferring, by the tablet commuter, a file to the mobile phone in the interface, the file currently opened on the tablet computer is transferred to the mobile phone.

Figure 3F:
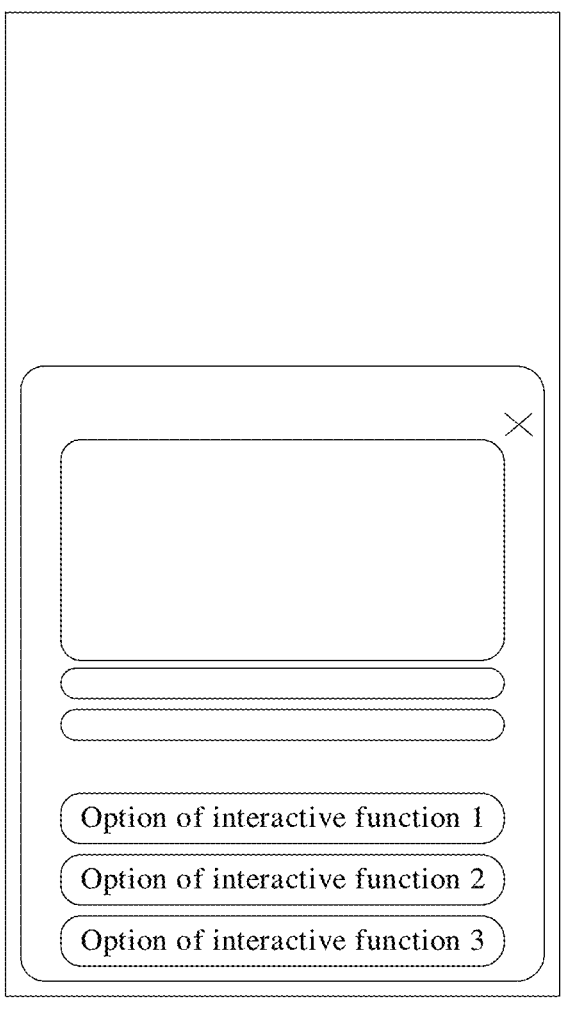
FIG. 3f is a schematic diagram of another function selection interface according to an embodiment of this application.
Figure 3G:
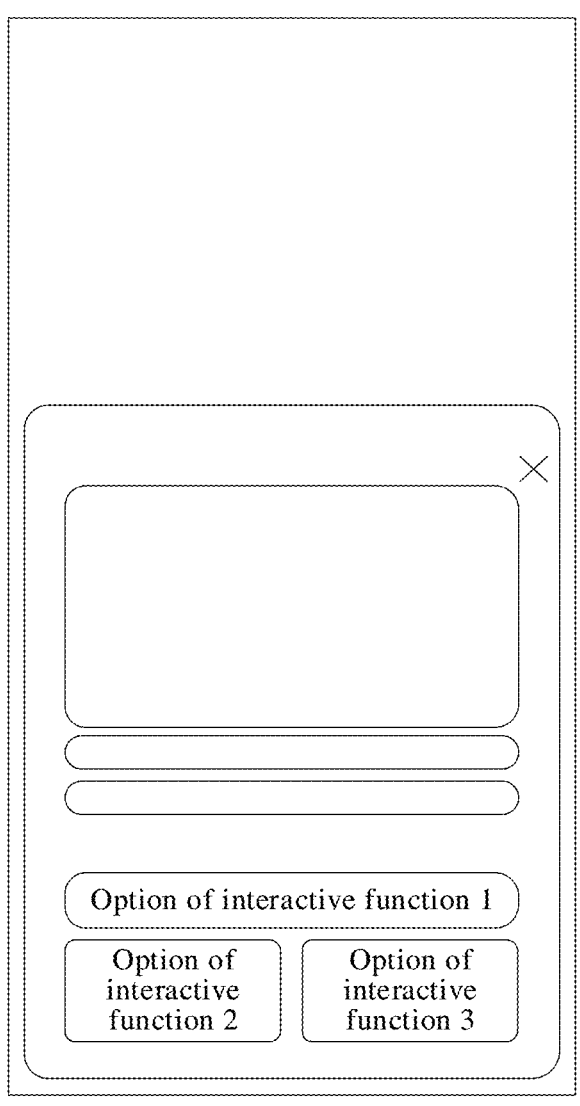
FIG. 3g is a schematic diagram of a function selection interface according to an embodiment of the present application.
Figure 3H:
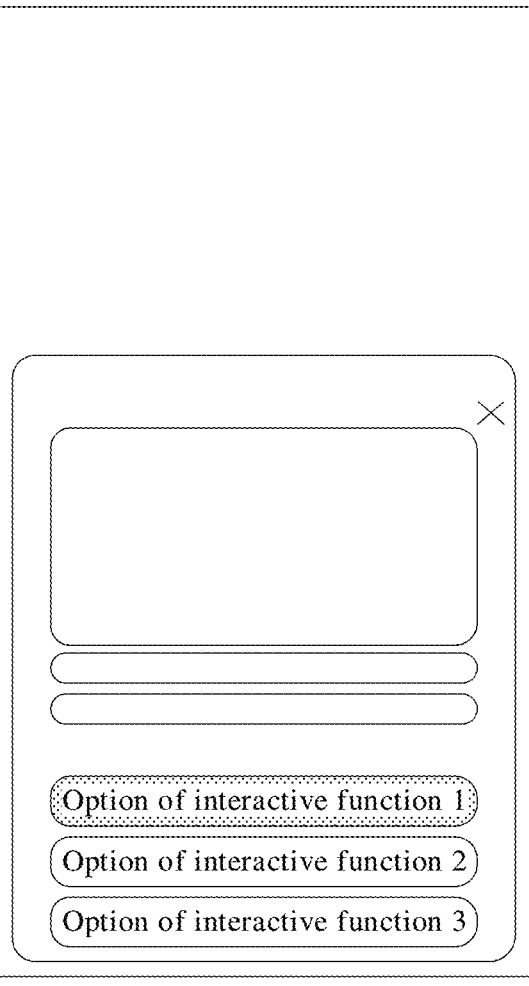
FIG. 3h is a schematic diagram of another function selection interface according to an embodiment of this application.
Figure 3I:
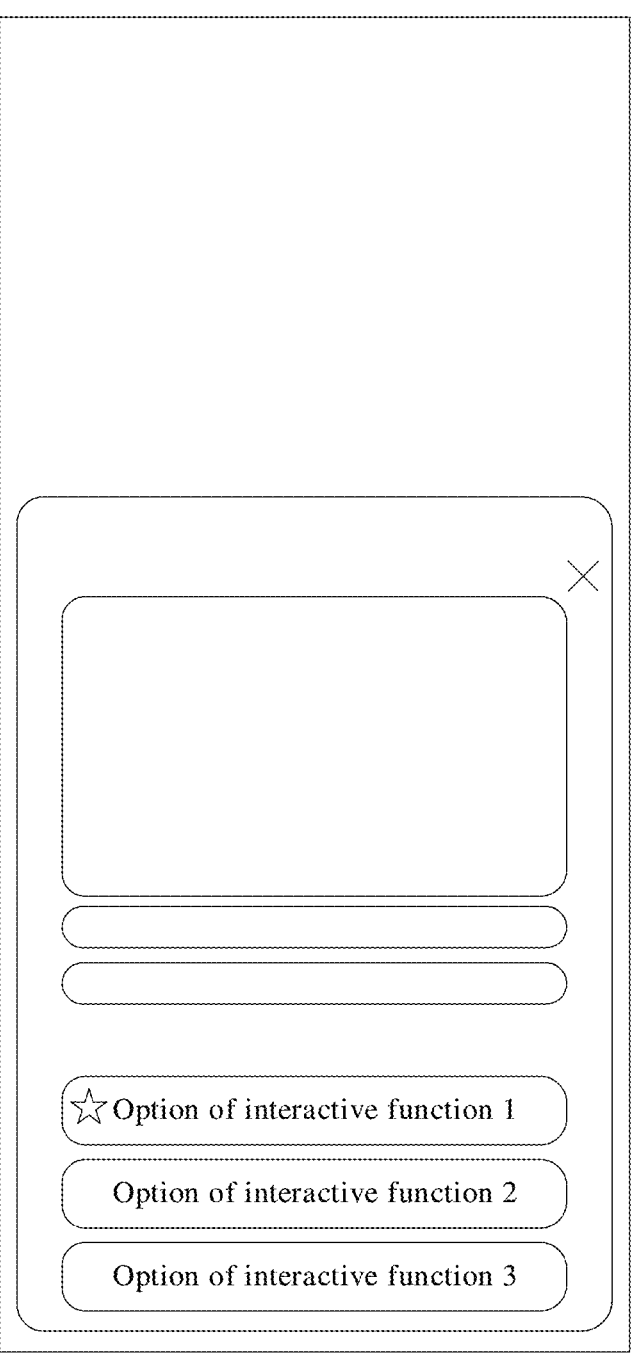
FIG. 3i is a schematic diagram of another function selection interface according to an embodiment of this application.
Figure 3J:
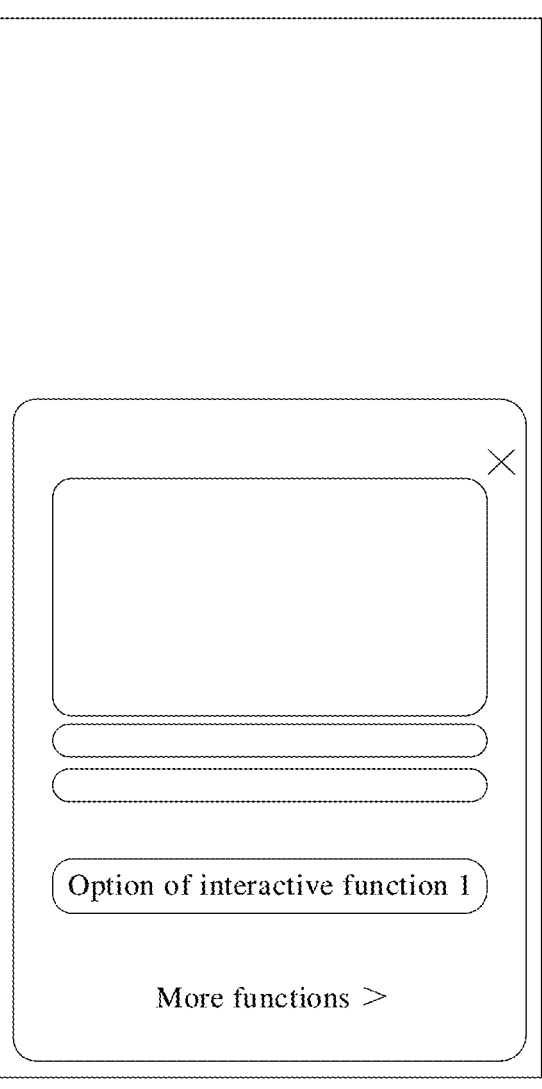
FIG. 3j is a schematic diagram of another function selection interface according to an embodiment of this application.

Optionally, in the process of generating the function selection interface in step 1022, usages of the interactive functions may be determined by big data analysis or machine learning, and a different function selection interface may be generated according to a different usage. For example, usages of the interactive functions of the device in a same scenario in a period of time are analyzed. The scenario herein may be determined by using the NFC device status information. The same NFC device status information means the same scenario. For example, the master device is a mobile phone that is running the desktop of the system B in the foreground, and the slave device is a tablet computer that is running the system B in the foreground. When the master device touches the slave device to trigger NFC, three interactive functions, that is, an interactive function 1, an interactive function 2, and an interactive function 3 corresponding to the NFC device status information are determined. At this time, an analysis is performed on usages of the interactive functions that are finally triggered when the current device is determined to have the same NFC device status information within a preset period of time. If differences among the usages of the interactive functions are within 10%, the function selection interface shown in FIG. 3f is generated. The options corresponding to the three interactive functions are arranged equally. In a case that a value by which a usage in usages of the at least one interactive function ranked first is greater than a usage in the usages of the at least one interactive function ranked second is within a first threshold range, the interactive function option corresponding to the usage ranked first is prominently displayed in the function selection interface relative to the interactive function options of other interactive functions. For example, FIG. 3g to FIG. 3j show three interactive functions, that is, an interactive function 1, an interactive function 2, and an interactive function 3 provided according to the NFC device status information. The three interactive functions are ranked as the interactive function 1, the interactive function 2 and the interactive function 3 in descending order of usage, and the usage of the interactive function 1 exceeds that of the interactive function 2 by 20% to 50%. In this case, the function selection interfaces shown in FIG. 3g to FIG. 3j are generated. The option of the interactive function 1 is prominently displayed, and the options of the interactive function 2 and the interactive function 3 are inconspicuously displayed. In FIG. 3g, the option is prominently displayed by occupying a larger area, and the area of the option of the interactive function 1 is greater than those of the options of the interactive function 2 and the interactive function 3. In FIG. 3h, the option of the interactive function 1 is prominently displayed by using a visual feature. For example, the option of the interactive function 1 is prominently displayed relative to the options of the interactive function 2 and the interactive function 3 by using visual features such as a color, a shadow, a highlight, or a gradient. In FIG. 3i, the option of the interactive function 1 is prominently displayed by adding an additional element. In FIG. 3j, the option of the interactive function 1 is prominently displayed by hiding the options of the interactive function 2 and the interactive function 3 in a next menu. When the user selects the option of "interactive function 1", a corresponding interactive function 1 is executed. When the user selects "more functions", the next menu is displayed, and the options of the interactive function 2 and the interactive function 3 are displayed in the next menu for further selection by the user.

Optionally, as shown in FIG. 4, FIG. 4 is a flowchart of another interaction control method according to an embodiment of this application. Before generating the function selection interface in step 1022, the method further includes the following steps:

Step 103: Determining whether a value by which a usage in usages of the at least one interactive function ranked first is greater than a usage in the usages of the at least one interactive function ranked second is greater than a second threshold, and performing step 104 in a case that the value is greater than the second threshold, or performing step 1022 of generating the function selection interface in a case that the value is not greater than the second threshold.

Step 104: Executing the interactive function corresponding to the usage ranked first.

Specifically, for example, the three interactive functions, that is, the interactive function 1, the interactive function 2 and the interactive function 3 are provided according to the NFC device status information. The three interactive functions are ranked as the interactive function 1, the interactive function 2 and the interactive function 3 in descending order of usage, and the usage of the interactive function 1 exceeds that of the interactive function 2 by 60%. That is to say, the usage of the interactive function 1 is significantly greater than those of other functions by more than 50%. Therefore, the interactive function 1 is directly executed without displaying the function selection interface.

Optionally, the above at least one interactive function includes a permanent interactive function and a replaceable interactive function, and the preset mapping relationship is used for reflecting a correspondence between the replaceable interactive function and the NFC device status information. For example, as shown in FIG. 3a to FIG. 3e, the multi-screen collaboration function is a permanent interactive function. That is to say, the multi-screen collaboration function is always provided regardless of what type of NFC device status information, and other functions are interactive functions to be adjusted according to the NFC device status information.

An embodiment of this application further provides an interaction control apparatus. The apparatus includes a processor and a memory, where the memory is configured to store at least one instruction, and the instruction, when loaded and executed by the processor, implements the interaction control method in the above embodiment.

A specific process and principles of the interaction control method are the same as those in the above embodiment, and details are not described herein again. One or more processors may be arranged, and the processor and the memory may be connected by a bus or in other manners. The memory is a non-transitory computer-readable storage medium, and may be configured to store a non-transitory software program, a non-transitory computer-executable program, and a module. The processor executes various functional applications and data processing by running the non-transitory software program, instructions, and the module stored in the memory, that is, implements the method in any one of the above method embodiments. The memory may include a program storage area and a data storage area. The program storage area may store an operating system, an application program that is required for at least one function, necessary data, or the like. In addition, the memory may include a high-speed random access memory, and may further include a non-transitory memory, such as at least one magnetic disk memory device, a flash memory device, or other non-transitory solid-state memory devices.

An embodiment of this application further provides a terminal. The terminal includes the above interaction control apparatus. Specifically, the terminal may be a smart terminal device such as a mobile phone or a tablet computer.

An embodiment of this application further provides a computer-readable storage medium. A computer program is stored in the computer-readable storage medium, and the computer program, when executed on a computer, causes the computer to perform the above interaction control method.

All or some of the foregoing embodiments may be implemented by using software, hardware, firmware, or any combination thereof. When software is used for implementation, implementation may be entirely or partially performed in the form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In the embodiments of this application, "at least one" refers to one or more, and "a plurality of" refers to two or more. And/or describes an association relationship for describing associated objects and represents that three relationships may exist. For example, A and/or B may represent the following cases: Only A exists, both A and B exist, and only B exists. A and B may be singular or plural. The character "/" generally indicates an "or" relationship between the associated objects. "At least one of the following" or a similar expression thereof refers to any combination of these items, including one item or any combination of a plurality of items. For example, at least one of a, b, and c may represent: a, b, c, a-b, a-c, b-c, or a-b-c, where a, b, and c may be single or multiple.

The foregoing are merely preferred embodiments of this application and are not intended to limit this application. For a person skilled in the art, this application may have various modifications and changes. Any modification, equivalent replacement, improvement and the like made without departing from the spirit and principle of this application shall fall within the protection scope of this application.

What is claimed is:

1. An interaction control method, comprising:
acquiring near field communication (NFC) device status information in response to triggering of NFC, wherein the NFC device status information comprises status information of a first device and status information of a second device;
providing at least one interactive function corresponding to the acquired NFC device status information; and
executing an interactive function of the at least one interactive function in response to a trigger condition to realize information exchange between the first device and the second device.

2. The method according to claim 1, wherein:
the status information of the first device comprises information of a foreground application of the first device and a status of the foreground application of the first device; and
the status information of the second device comprises information of a foreground application of the second device and a status of the foreground application of the second device.

3. The method according to claim 2, wherein:
the status information of the first device further comprises a type of the first device; and
the status information of the second device further comprises a type of the second device.

4. The method according to claim 1, wherein:
the at least one interactive function is at least one interactive function of a plurality of interactive functions, and
providing the at least one interactive function corresponding to the acquired NFC device status information, and executing the interactive function of the at least one interactive function in response to the trigger condition, to realize the information exchange between the first device and the second device comprises:

providing the at least one interactive function corresponding to the acquired NFC device status information according to a preset mapping relationship;
generating a function selection interface, wherein the function selection interface comprises a respective interactive function option corresponding to each of the plurality of interactive functions; and
executing a corresponding interactive function in response to selection of at least one of the respective interactive function options, to realize the information exchange between the first device and the second device.

5. The method according to claim 4, wherein:
a first usage of the at least one interactive function is ranked first in a ranking of usages of the plurality of interactive functions,
a second usage of another interactive function of the plurality of interactive functions is ranked second in the ranking of usages,
a value by which the first usage is greater than the second usage is within a first threshold range, and
the method further comprises displaying an interactive function option corresponding to the at least one interactive function prominently relative to the respective interactive function options corresponding to corresponding to other interactive functions of the plurality of interactive functions.

6. The method according to claim 4, wherein, before generating the function selection interface, the method further comprises:
determining whether a value by which a first usage in usages of the at least one interactive function ranked first is greater than a second usage in the usages of the at least one interactive function ranked second is greater than a threshold; and
performing the following:
executing the at least one interactive function corresponding to the first usage ranked first when the value is greater than the threshold; or
generating the function selection interface when the value is not greater than the threshold.

7. The method according to claim 4, wherein:
the at least one interactive function comprises a permanent interactive function and a replaceable interactive function, and
the preset mapping relationship comprises a correspondence between the replaceable interactive function and the NFC device status information.

8. The method according to claim 1, wherein the first device is a mobile phone that is playing a video by using a first application in a mobile phone foreground, and the second device is a tablet computer that is running the first application in a tablet computer foreground but is not playing the video, and when the first device touches the second device to trigger the NFC, the at least one interactive function comprises continuing playback of the video on the tablet computer from the mobile phone and is provided, and a second interactive function of multi-screen collaboration is provided.

9. The method according to claim 1, wherein the first device is a mobile phone that is running a first application in a mobile phone foreground but is not playing a video, and the second device is a tablet computer that is running the first application in a tablet computer foreground and is playing the video, and when the first device touches the second device to trigger the NFC, the at least one interactive function comprises continuing playback of the video on the mobile phone from the tablet computer is provided, and a second interactive function of multi-screen collaboration is provided.

10. The method according to claim 1, wherein the first device is a mobile phone that is running a second application in a mobile phone foreground and the second application is a text processing application that is opening a file, and the second device is a tablet computer that is running the second application in a tablet computer foreground but is not opening the file, and when the first device touches the second device to trigger the NFC, the at least one interactive function comprises transferring, by the mobile phone, the file to the tablet computer and is provided, and a second interactive function of multi-screen collaboration is provided.

11. The method according to claim 1, wherein the first device is a mobile phone that is running a second application in a mobile phone foreground and the second application is a text processing application that is not opening a file, and the second device is a tablet computer that is running the second application in a tablet computer foreground and is opening the file, and when the first device touches the second device to trigger the NFC, the at least one interactive function comprises transferring, by the tablet computer, the file to the mobile phone and is provided, and a second interactive function of multi-screen collaboration is provided.

12. An interaction control method, comprising:
acquiring, by a first device, near field communication (NFC) device status information in response to a trigger condition of NFC, wherein the NFC device status information comprises status information of the first device and status information of a second device;
determining, by the first device, an interactive function corresponding to the acquired NFC device status information;
transferring, by the first device, a first file corresponding to the interactive function to the second device; and
receiving, by the first device, a second file corresponding to the interactive function from the second device.

13. The method according to claim 12, wherein:
the trigger condition of NFC comprises the first device and the second device touching each other.

14. The method according to claim 12, wherein:
the status information of the first device comprises information of a foreground application of the first device and a status of the foreground application of the first device; and
the status information of the second device comprises information of a foreground application of the second device and a status of the foreground application of the second device.

15. The method according to claim 12, wherein:
the status information of the first device comprises a first device type of the first device; and
the status information of the second device comprises a second device type of the second device.

16. A device, comprising:
at least one processor; and a memory, wherein the memory stores at least one instructions, and the instructions, when loaded and executed by the at least one processor, cause the at least one processor to:
acquire near field communication (NFC) device status information in response to triggering of NFC, wherein the NFC device status information comprises status information of a first device and status information of a second device;
provide at least one interactive function corresponding to the acquired NFC device status information; and
execute an interactive function of the at least one interactive function in response to a trigger condition to realize information exchange between the first device and the second device.

17. The device according to claim 16, wherein:
the status information of the first device comprises information of a foreground application of the first device and a status of the foreground application of the first device; and
the status information of the second device comprises information of a foreground application of the second device and a status of the foreground application of the second device.

18. The device according to claim 17, wherein:
the status information of the first device further comprises a type of the first device; and
the status information of the second device further comprises a type of the second device.

19. The device according to claim 16, wherein:
the at least one interactive function is at least one interactive function of a plurality of interactive functions, and
providing the at least one interactive function corresponding to the acquired NFC device status information, and executing the interactive function of the at least one interactive function in response to the trigger condition, to realize the information exchange between the first device and the second device comprises:
providing the at least one interactive function corresponding to the acquired NFC device status information according to a preset mapping relationship;
generating a function selection interface, wherein the function selection interface comprises a respective interactive function option corresponding to each of the plurality of interactive functions; and
executing a corresponding interactive function in response to selection of at least one of the respective interactive function options, to realize the information exchange between the first device and the second device.

20. The device according to claim 19, wherein:
the at least one interactive function comprises a permanent interactive function and a replaceable interactive function, and
the preset mapping relationship comprises a correspondence between the replaceable interactive function and the NFC device status information.

* * * * *